US010193357B2

(12) United States Patent
Marinov

(10) Patent No.: US 10,193,357 B2
(45) Date of Patent: Jan. 29, 2019

(54) ENERGY STORAGE SYSTEM

(71) Applicant: TWS (Macau Commercial Offshore) Limited, Macao (CN)

(72) Inventor: Peter Marinov, Irvine (GB)

(73) Assignee: TWS (MACAU COMMERCIAL OFFSHORE) LIMITED, Macao (CN)

( * ) Notice: Subject to any disclaimer, the term of this patent is extended or adjusted under 35 U.S.C. 154(b) by 204 days.

(21) Appl. No.: 14/901,425

(22) PCT Filed: Jun. 24, 2014

(86) PCT No.: PCT/GB2014/000248
§ 371 (c)(1),
(2) Date: Dec. 28, 2015

(87) PCT Pub. No.: WO2014/207421
PCT Pub. Date: Dec. 31, 2014

(65) Prior Publication Data
US 2016/0372942 A1    Dec. 22, 2016

(30) Foreign Application Priority Data

Jun. 26, 2013   (GB) .................................. 1311358.4
Jun. 26, 2013   (GB) .................................. 1311378.4
(Continued)

(51) Int. Cl.
*H02J 7/00*      (2006.01)

(52) U.S. Cl.
CPC .............. *H02J 7/0021* (2013.01); *H02J 7/00* (2013.01); *H02J 7/007* (2013.01); *H02J 7/0029* (2013.01);
(Continued)

(58) Field of Classification Search
USPC ......................................................... 320/107
See application file for complete search history.

(56) References Cited

U.S. PATENT DOCUMENTS 6,153,947 A    11/2000  Rockow et al.
6,259,171 B1    7/2001  Cheng
(Continued)

FOREIGN PATENT DOCUMENTS

| EP | 1858132 A2 | 11/2007 |
|---|---|---|
| WO | WO96/7425 A2 | 6/1996 |
| WO | 2013046978 A1 | 4/2013 |

OTHER PUBLICATIONS

International Search Report for Application No. PCT/GB2014/000248, Applicant TWS (Macao Commerical Offshore) Limited et al, dated Nov. 4, 2014.
(Continued)

*Primary Examiner* — Robert Grant
(74) *Attorney, Agent, or Firm* — Drinker Biddle & Reath LLP

(57) ABSTRACT

An energy storage system having battery building blocks which contribute load current to the output of the energy storage system. A system controller provides functional control of the energy storage system and communication to an external host, a system charger charges cells in the battery building blocks and an interface provides a separate connection for at least two battery building blocks to allow the at least two battery building blocks to be separately removed from the energy storage system. The system controller diverts the flow of current from a charger to provide a contribution to the load current in place of the contribution to the load current from the battery building block being replaced to allow said battery building block to be replaced whilst the energy storage system is in operation. The system may also be used to charge battery building blocks based upon their capacity and charging profile using an integral charger located within the energy storage system which is
(Continued)

able to provide the requisite charge level and charging profile to respective battery building blocks.

21 Claims, 8 Drawing Sheets

(30) Foreign Application Priority Data

Sep. 23, 2013 (CN) .......................... 2013 1 0435880
Sep. 23, 2013 (CN) .......................... 2013 1 0435888

(52) U.S. Cl.
CPC ..... *H02J 7/0068* (2013.01); *H02J 2007/0039* (2013.01)

(56) References Cited

U.S. PATENT DOCUMENTS

| | | | |
|---|---|---|---|
| 6,741,065 B1* | 5/2004 | Ishii | B60L 11/1816 320/122 |
| 2009/0189451 A1 | 7/2009 | Roepke | |
| 2010/0007217 A1 | 1/2010 | Steele et al. | |
| 2010/0289447 A1* | 11/2010 | Dobson | H01M 10/46 320/101 |
| 2012/0286570 A1 | 11/2012 | Radovcic et al. | |
| 2013/0162048 A1 | 6/2013 | Kim et al. | |
| 2013/0328530 A1* | 12/2013 | Beaston | H01M 10/4207 320/128 |
| 2014/0114592 A1* | 4/2014 | Eilertsen | G01R 31/028 702/58 |

OTHER PUBLICATIONS

Written Opinion of the International Searching Authority for Application No. PCT/GB2014/000248, Applicant TWS (Macao Commerical Offshore) Limited et al, dated Nov. 4, 2014.

Patents Act 1977: Search Report Under Section 17 for Application No. GB1311358.4, dated Dec. 27, 2013.

* cited by examiner

ENERGY STORAGE SYSTEM

CROSS-REFERENCE TO RELATED APPLICATIONS

This application incorporates by reference and claims priority to British App. Nos. 1311358.4 and 1311378.4, filed on Jun. 26, 2013, Chinese App. Nos. 201310435888.7 and 201310435880.0, and PCT App. No. PCT/GB2014/000248, filed on Jun. 24, 2014.

INTRODUCTION

The present invention relates to an energy storage system (ESS) and in particular one which may be used as a large scale battery for use in critical applications and for charging such systems.

BACKGROUND

Energy storage systems may comprise a number of battery building blocks (BBBs) which are connected together to form a battery and which are controlled by a battery management system (BMS).

It is known to charge batteries in energy storage systems directly using an external charger in order to provide the desired voltage and current profile for the actual battery chemistry used. In a series circuit, a charging current supplied from the external charger positive terminal passes through the battery building blocks of the energy storage system and exits to a charger negative.

However, the overall charge capacity of the ESS is equal to the lowest capacity BBB, multiplied by the number of blocks, as the charging process stops once the BBB with the lowest capacity reaches full charge. Therefore, in cases where one BBB has significantly reduced capacity with respect to the other BBBs in the ESS, the overall capacity of the ESS is greatly reduced and much of the capacity of healthier BBBs may go unused.

Hot swapping is a terms which is used to describe the replacement of electronic components without shutting down or having a significant interruption in the system in which they operate. Hot swapping is used whenever it is desirable to change the configuration, replace components or repair a system without interrupting its operation.

It is known to provide hot swapping in ESSs by having multiple BBBs, for example, by including double (1+1) or multiple (N+1) batteries to provide a suitable level of redundancy. Known prior art frequently presents the traditional redundancy and hot-swap replacement principle where two or more independent modular batteries work in parallel and replacement of a battery module is achieved by switching off the battery which contains the module which is to be replaced while the others provide the power It is an object of the present invention to provide an improved Energy Storage System.

SUMMARY OF THE INVENTION

In accordance with a first aspect of the invention there is provided an energy storage system comprising:
a plurality of battery building blocks which contribute load current to the output of the energy storage system, the battery building blocks comprising one or more electrical cell and a cell controller;
a system controller for providing functional control of the energy storage system and communication to an external host;
one or more system charger for charging the cells in the battery building blocks;
an interface which provides a separate connection for at least two battery building blocks to allow the at least two battery building blocks to be separately removed from the energy storage system wherein, the system controller;
monitors the condition of the battery building blocks and determines a requirement to replace one of said battery building blocks; and
diverts the flow of current from a charger to provide a contribution to the load current in place of the contribution to the load current from the battery building block being replaced to allow said battery building block to be replaced whilst the energy storage system is in operation.

Preferably, the system controller detects BBB malfunction based upon data received from the cell controller.

Preferably, the charger from which current is diverted is the charger which, in normal use, provides current to the battery building block which is to be replaced.

Preferably, the contribution to the load current from the charger matches the normal operational current from the battery building block which is being replaced.

Preferably, the cell controller monitors the cells in a BBB and collects data related to the state of charge and state of health of the cells in the BBB.

Preferably, the BBB further comprises protection circuitry.

Preferably, the protection circuitry provides overcurrent and/or short-circuit, overvoltage and/or under voltage and/or over temperature protection.

Preferably, the cell controller comprises a Fuel Gauge.

Preferably, the Fuel Gauge comprises a coulomb counter.

Optionally, the Fuel Gauge comprises an impedance tracker.

Preferably, the cell controller calculates the State of Charge (SoC) of the BBB.

Preferably, the cell controller calculates the BBBs current capacity.

Preferably, the cell controller comprises a microprocessor controller which calculates the State of Health (SoH) of the BBB from the data provided by the Fuel Gauge.

Preferably, the State of Health (SoH) data is stored in a memory device located within the BBB.

Preferably, the local memory device stores up to date information on BBB operating parameters.

The stored operating parameters may include battery chemistry, number of cells, voltage, current, temperature, remaining and designed capacity, relative and absolute SoC, predicted SoH, statistical parameters serial number, time in service and lifetime exploitation data (maximum current, voltage, temperature etc.)

Preferably, the system controller comprises n Chargers which provide dedicated charging or supporting the discharge current in n separate BBBs.

Optionally, the system comprises n Chargers which provide charging or supporting the discharge current in m separate BBBs where m>n.

Preferably, the system controller further comprises a matrix of power switches, which connects the power output of respective chargers to the BBBs.

Preferably, the system controller is contained in a housing.

Preferably, the system controller is removeably coupled to the BBB to allow easy plug in and out of an individual BBB.

Preferably, the BBB is placed in a plug-in tray and those trays are plugged into the housing which provides power connection and control signal communication between the BBB and the system controller.

In accordance with a second aspect of the invention there is provided a method of replacing a battery building block in an energy storage system, the method comprising the steps of:
detecting the condition of a plurality of battery building blocks in the energy storage system;
determining a requirement to replace one or more of said battery building blocks;
diverting the flow of current from a charger to provide a contribution to the load current in place of the contribution to the load current from the battery building block to be replaced; and
replacing said battery building block whilst the energy storage system is in operation.

Preferably, the step of replacing said battery building block includes the provision of a separate physical connection for at least two battery building blocks to allow the at least two battery building blocks to be separately removed from the energy storage system;

Preferably, the plurality of battery building blocks comprise one or more electrical cell which contribute load current to the output of the energy storage system and a cell controller.

Preferably, the method further comprises providing functional control of the energy storage system and communication to an external host.

Preferably, the step of monitoring a requirement to replace one or more of said battery building blocks comprises detecting battery building block malfunction based upon data received from the cell controller.

Preferably, the charger from which current is diverted is the charger which, in normal use, provides current to the battery building block which is to be replaced.

Preferably, the contribution to the load current from the charger matches the normal operational current from the battery building block which is being replaced.

Preferably, the step of determining a requirement to replace one or more of said battery building blocks comprises monitoring the cells in a BBB and collecting data related to the state of charge and state of health of the cells in the BBB.

Preferably, the step of monitoring cells is undertaken using a Fuel Gauge.

Preferably, the step of monitoring cells is undertaken using a coulomb counter.

Optionally, the step of monitoring cells is undertaken using an impedance tracker.

Preferably, the step of monitoring cells calculates the State of Charge (SoC) of the battery building block.

Preferably, the step of monitoring cells the battery building block current capacity.

Preferably, the step of monitoring cells comprises calculating the State of Health (SoH) of the BBB from the data provided by the Fuel Gauge.

Preferably, the State of Health (SoH) data is stored in a memory device located within the BBB.

Preferably, the local memory device stores up to date information on BBB operating parameters.

The stored operating parameters may include battery chemistry, number of cells, voltage, current, temperature, remaining and designed capacity, relative and absolute SoC, predicted SoH, statistical parameters serial number, time in service and lifetime exploitation data (maximum current, voltage, temperature etc.)

Preferably, the method of replacing a battery building block in an energy storage system which accommodates n Chargers which provide dedicated charging or supporting the discharge current in n separate BBBs.

Preferably, the method of replacing a battery building block in an energy storage system which accommodates n Chargers which provide charging or supporting the discharge current in m separate BBBs where m>n.

In accordance with a third aspect of the invention there is provided a method for charging one or more battery building block in an energy storage system, the method comprising the steps of:
determining the capacity and charging profile of a plurality of battery building blocks (BBB) in the energy storage system;
charging the BBBs based upon their capacity and charging profile using an integral charger located within the energy storage system which is able to provide the requisite charge level and charging profile to respective BBBs.

Advantageously, the method of the present invention is designed to achieve the maximum charge capacity for the BBB.

Preferably, each BBB receives charge from a dedicated charging source.

More preferably, the BBB receives charge from a single dedicated charging source.

Preferably, the charging source is an integral charger.

The additional charging source is supplied from a dedicated charge terminal

Preferably, the plurality of battery building blocks comprise one or more electrical cell which contribute load current to the output of the energy storage system and a cell controller.

Advantageously, the charging current is provided from an external power supply, which has a a wider output voltage range and does not have to provide the charging profile for the battery chemistry used.

Preferably, the step of determining the capacity and charging profile of one or more battery building blocks comprises monitoring the cells in a BBB and collecting data related to the state of charge and state of health of the cells in the BBB.

Preferably, the step of determining the capacity and charging profile of a plurality of battery building blocks comprises measuring battery building block using a cell controller.

Preferably, the integral charger provides the charging profile for the corresponding BBB, based on the information provided from the cell controller.

Preferably, the step of calculating the additional capacity of the stronger BBBs is achieved using the cell controller.

Optionally, the cell controller is located on the BBB.

Preferably, the step of determining the capacity and charging profile is undertaken using a Fuel Gauge.

Preferably, the step of determining the capacity and charging profile is undertaken using a coulomb counter.

Optionally, the step of determining the capacity and charging profile is undertaken using an impedance tracker.

Preferably, the step of determining the capacity and charging profile calculates the State of Charge (SoC) of the battery building block.

Preferably, the step of determining the capacity and charging profile comprises calculating the State of Health (SoH) of the BBB from the data provided by the Fuel Gauge.

Preferably, the State of Health (SoH) data is stored in a memory device located within the BBB.

Preferably, the local memory device stores up to date information on BBB operating parameters.

In accordance with a fourth aspect of the invention there is provided a method for charging one or more battery building block in an energy storage system, the method comprising the steps of:

determining the capacity and charging profile of a plurality of battery building blocks (BBB) in the energy storage system;

identifying the weakest BBB in terms of its capacity to receive charge;

calculating the additional capacity of the stronger BBBs;

charging the BBBs in the ESS up to the capacity of the weakest BBB using an ESS charger connected in series with the BBBs; and charging one or more of the stronger BBBs up to their capacity using one or more additional charging source which is able to provide the requisite additional charge to respective BBBs.

Advantageously, the method of the present invention is designed to achieve the maximum charge capacity for BBB.

Preferably, the BBB receives charge from a dedicated charging source.

More preferably, the BBB receives charge from a single dedicated charging source.

Preferably, the charging source is an integral charger.

The additional charging source is supplied from a dedicated charge terminal

Preferably, the plurality of battery building blocks comprise one or more electrical cell which contribute load current to the output of the energy storage system and a cell controller.

Advantageously, the charging current is provided from an external power supply, which has a a wider output voltage range and does not have to provide the charging profile for the battery chemistry used.

Preferably, the step of determining the capacity and charging profile of one or more battery building blocks comprises monitoring the cells in a BBB and collecting data related to the state of charge and state of health of the cells in the BBB.

Preferably, the integral charger provides the charging profile for the corresponding BBB, based on the information provided from the cell controller.

Preferably, the step of calculating the additional capacity of the stronger BBBs is achieved using a cell controller.

Optionally, the cell controller is located on the BBB.

Preferably, the step of determining the capacity and charging profile is undertaken using a Fuel Gauge.

Preferably, the step of determining the capacity and charging profile is undertaken using a coulomb counter.

Optionally, the step of determining the capacity and charging profile is undertaken using an impedance tracker.

Preferably, the step of determining the capacity and charging profile calculates the State of Charge (SoC) of the battery building block.

Preferably, the step of determining the capacity and charging profile of the battery building block current capacity.

Preferably, the step of determining the capacity and charging profile comprises calculating the State of Health (SoH) of the BBB from the data provided by the Fuel Gauge.

Preferably, the State of Health (SoH) data is stored in a memory device located within the BBB.

Preferably, the local memory device stores up to date information on BBB operating parameters.

Preferably, the intergral charger is powered by an external power supply, the external power supply having a wider output voltage range than that which is required to charge the ESS.

Preferably, the integral charger provides the charging profile for the corresponding BBB, based on the information provided from the cell controller.

Preferably, the cell controller located on the ESS.

Preferably, the cell controller is located on the BBB.

Preferably, the integral charger is located upon the BBB.

In accordance with a fifth aspect of the invention there is provided an energy storage system comprising:

a plurality of battery building blocks which comprise one or more electrical cell which contribute load current to the output of the energy storage system and a cell controller;

a system controller for providing functional control of the energy storage system and communication to an external host;

one or more charger for charging the cells in the battery building blocks; wherein the system charger is supplied from an external power supply, the external power supply having a wider output voltage range than that which is required to charge the ESS and the charge supplied to the BBB from the external power supply is controlled using a charging profile provided by a cell controller.

In accordance with a sixth aspect of the invention there is provided an energy storage system comprising:

a plurality of battery building blocks which comprise one or more electrical cell which contribute load current to the output of the energy storage system and a cell controller;

a system controller for providing functional control of the energy storage system and communication to an external host;

one or more system charger for charging the cells in the battery building blocks;

wherein, the system controller;

determines the capacity and charging profile of the BBB based on the data from the BBB's cell controller in order to achieve the maximum charge capacity for the BBB;

the BBB in the ESS is charged from an external charger to match a desired voltage and current profile for the battery chemistry used and wherein the BBBs with higher capacity are provided with additional current from the system charger such that the BBBs with higher capacity can be charged beyond the capacity of the weakest cell.

Preferably, the BBBs with higher capacity are charged to their full charge capacity and provide maximum energy storage in the ESS.

Preferably, the cell controller is located on the BBB.

Preferably, the cell controller monitors the cells in a BBB and collects data related to the state of charge and state of health of the cells in the BBB.

Preferably, the BBB further comprises protection circuitry.

Preferably, the protection circuitry provides overcurrent and/or short-circuit, overvoltage and/or under voltage and/or over temperature protection.

Preferably, the cell controller comprises a Fuel Gauge.

Preferably, the Fuel Gauge comprises a coulomb counter.

Optionally, the Fuel Gauge comprises an impedance tracker.

Preferably, the cell controller calculates the State of Charge (SoC) of the BBB.

Preferably, the cell controller calculates the BBBs current capacity.

Preferably, the cell controller comprises a microprocessor controller which calculates the State of Health (SoH) of the BBB from the data provided by the Fuel Gauge.

Preferably, the State of Health (SoH) data is stored in a memory device located within the BBB.

Preferably, the local memory device stores up to date information on BBB operating parameters.

The stored operating parameters may include battery chemistry, number of cells, voltage, current, temperature, remaining and designed capacity, relative and absolute SoC, predicted SoH, statistical parameters serial number, time in service and lifetime exploitation data (maximum current, voltage, temperature etc.)

Preferably, the system controller comprises n Chargers which provide dedicated charging or supporting the discharge current in n separate BBBs.

Optionally, the system comprises n Chargers which provide charging or supporting the discharge current in m separate BBBs where m>n.

Preferably, the system controller further comprises a matrix of power switches, which connects the power output of respective chargers to the BBBs.

BRIEF DESCRIPTION OF THE DRAWINGS

The present invention will now be described by way of example only, with reference to the accompanying drawings in which.

DETAILED DESCRIPTION OF THE DRAWINGS

Figure 1:
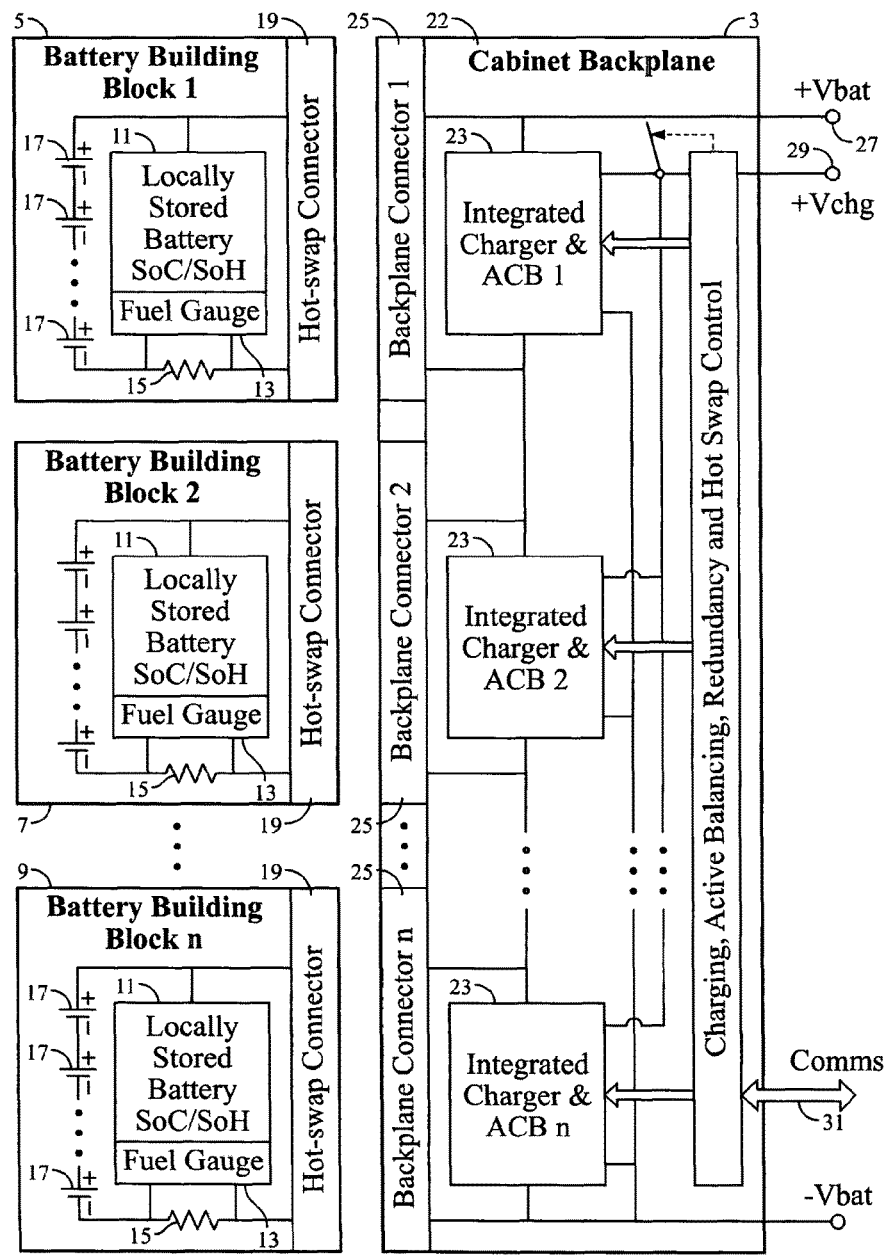
FIG. 1 is a schematic diagram of an embodiment of an ESS in accordance with the present invention.

FIG. 1 shows an example of an ESS in accordance with the present invention. In this example, three battery building blocks are shown, labelled 5, 7 and 9.

Each of the Battery Building Block 5, 7 and 9 contain multiple battery cells 17 configured in a xSyP stack. It will be appreciated that the BBB may contain a single cell. The BBB also has protection circuitry, providing over-current, short-circuit, overvoltage, under-voltage and over-temperature protection. The cell controller comprises a fuel gauge 13 and a microprocessor controller 11. Fuel Gauge 13 calculates the BBB current capacity and State of Charge (SoC) from the cell voltage, temperature and current and communicates this information to the controller 11. The fuel gauge may be a coulomb counter type, an impedance tracking device or other suitable device.

The microprocessor controller 11 calculates the State of Health (SoH) of the BBB from the data provided by the Fuel Gauge and stores this information in the memory device of the microprocessor controller 11.

The memory device of the microprocessor controller 11 stores up to date information pertaining to the BBB operating parameters. These include battery chemistry, number of cells, voltage, current, temperature, remaining and designed capacity, relative and absolute SoC, predicted SoH and statistical parameters such as serial number, time in service and lifetime exploitation data (maximum current, voltage, temperature etc.). The BBB also has a mechanical coupling 19 referred to as the Hot-Swap connector which provides means for plugging in and out of the BBB during operation.

The system controller 21 is shown generally and this term is used to describe the components which, in this example of the present invention, are contained within the housing or Cabinet 3 and which provide the control functions to a plurality of BBBs.

In this example of the present invention, multiple Chargers 23 which incorporate DC/DC converters, provide the means for charging or supporting the discharge current of each BBB 5, 7 and 9 and is referred to as the Integrated Charger and Active Cell Balancer 23 or Charger.

A matrix of power switches (not shown) provides the means of connecting the charger power output to each of the BBBs. From an operational point of view the preferred configuration is that the number of Chargers 23 matches the number of BBB.

The Hot-Swap connector sockets 25 provide the physical coupling which allows each of the BBBs 5, 7 and 9 to be separately removed from the ESS 1.

The Control and Communication Unit (CCU) of the system controller 21 controls the operation of the ESS in each of the operational modes described herein, namely, charging, discharging, discharging with a weak BBB support and Hot-Swap of a faulty BBB. The data from the individual BBB Local Memory Device 11 is accessible to the CCU 21 and may be forwarded to an external host controller via communications link 31 in order to determine the need for maintenance or replacement of a BBB that is approaching its end of life or is becoming faulty.

In this embodiment of the present invention, the ESS 1 has an enclosure which is a rigid mechanical structure, for example a 19" Rack, in which each of the BBBs 5, 7 and 9 is placed in a separate plug-in tray which is plugged into the Cabinet backplane providing power connection and control signal communication between each BBB and the Control and Communication Unit 21.

In another embodiment of the present invention, a modular structure of supporting enclosures, wire looms and connectors may be used to provide the means of power and control intercommunication between each individual BBB and the Cabinet Backplane. This is of particular use in ESSs with large numbers of BBBs.

Use of an ESS in accordance with the present invention in various modes of operation is described below. Charging is the process of transferring energy for storage into each individual BBB. The following example of the present invention illustrates three different charging modes.

Figure 2:
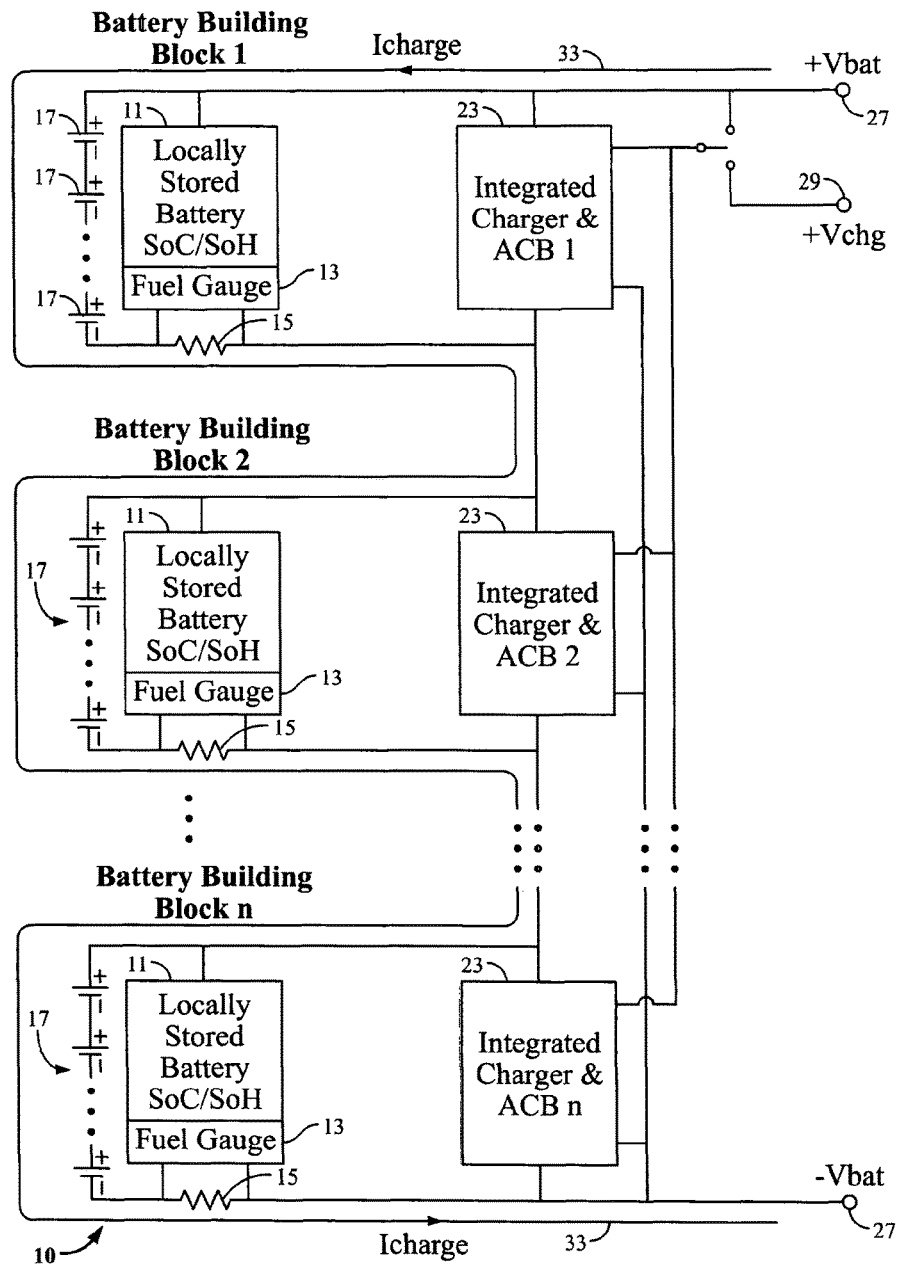
FIG. 2 is a schematic diagram which shows direct charging of battery building blocks BBBs in accordance with the example of FIG. 1.

FIG. 2 shows an example of direct charging of the BBBs 5, 7 and 9. In this example, the battery stack (all BBBs 5, 7 and 9 in a series connection) of the ESS 1 is charged from an external charger (not shown), providing the desired voltage and current profile for the actual battery chemistry used.

In this case the charging current Icharge 33, supplied from the external charger positive terminal via the ESS terminal +Vbat 27, passes through each BBB 5, 7 and 9 as they are connected in series and exits to the charger negative terminal via −Vbat 28. In this example, the overall charge capacity of the ESS is equal to the lowest capacity BBB, multiplied by the number of blocks, as the charging process stops once the BBB with the lowest capacity reaches full charge.

The second charging mode is direct charging of the BBBs with equalization support. In this example, the battery stack (all BBBs 5, 7 and 9 in a series connection) of the ESS 1 is charged from an external charger, providing the desired voltage and current profile for the actual battery chemistry used. The charging current flowing via each battery in the string is Icharge. Based on the data from the BBB's fuel gauge 13 each BBB's capacity is determined and in order to achieve the maximum charge capacity for each unit and respectively for the whole ESS, the blocks with higher capacity are supported by additional current, generated by the corresponding Integrated Charger and flowing only locally.

Figure 3:
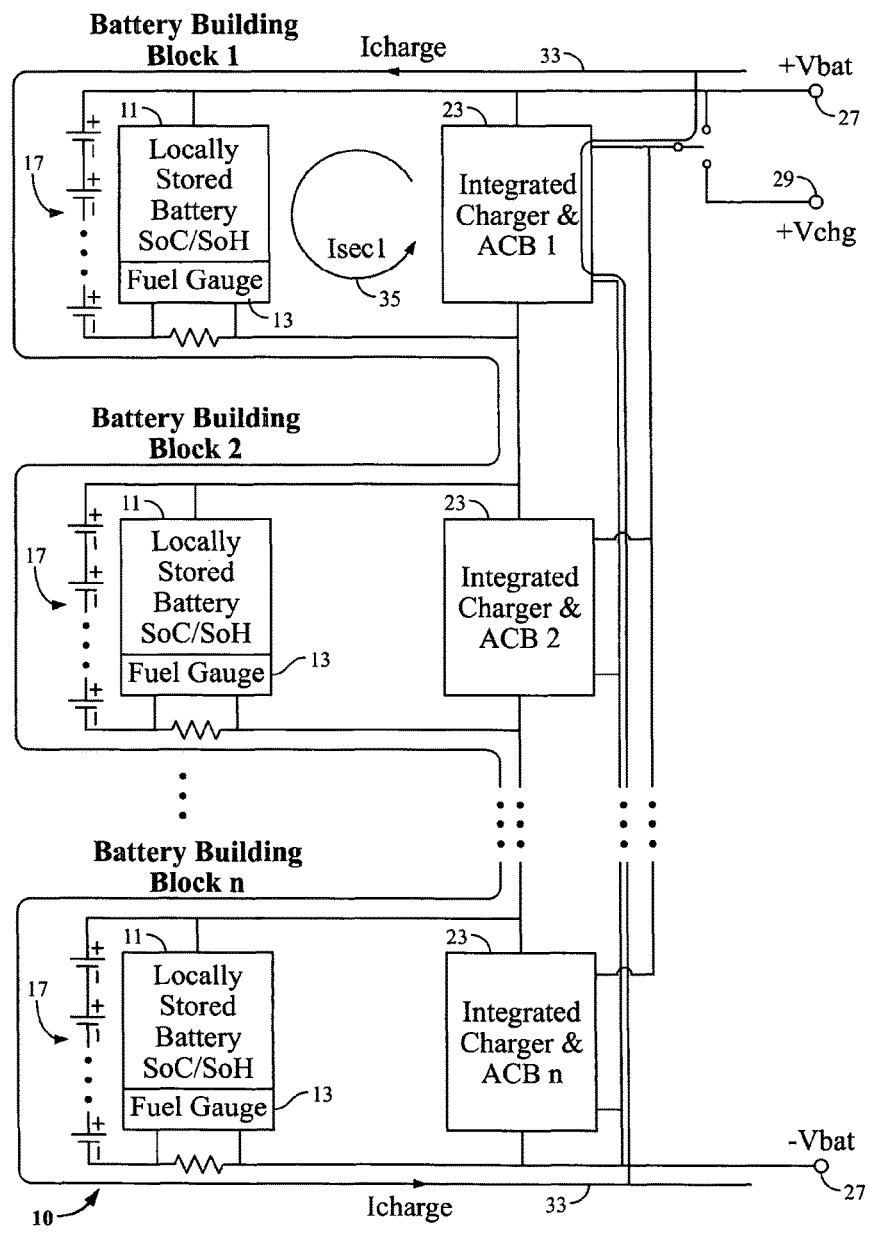
FIG. 3 is a schematic diagram which shows direct charging with equalisation support of battery building blocks BBBs in accordance with the example of FIG. 1.

In the example (FIG. 3), the BBB 5 has higher capacity than BBB 7 and BBB 9 and is being charged with a higher current=Icharge 33+Isec1 35. Advantageously, this approach allows for a faster charging of the blocks with a higher capacity and they can reach their full charge capacity at the same time as the weaker blocks, providing the maximum stored energy in the ESS.

Figure 4:
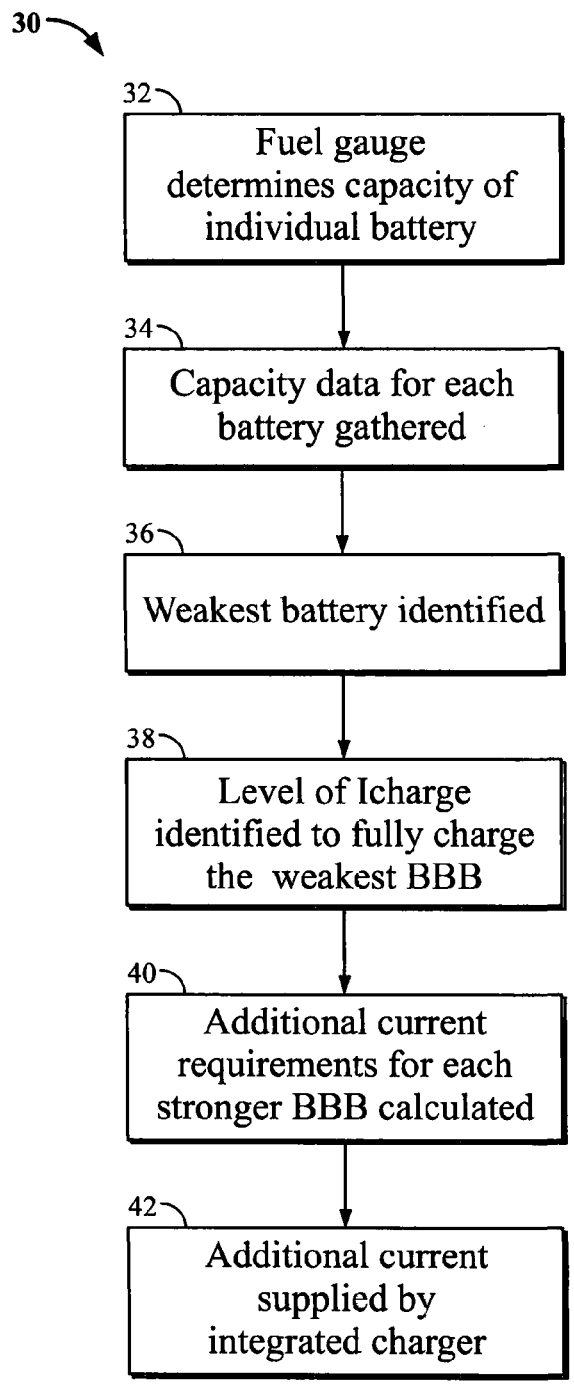
FIG. 4 is a flow diagram which illustrates the steps in the example of direct charging with equalisation support as shown in FIG. 3 and in accordance with the present invention.

FIG. 4 is a flow diagram which shows the procedural steps of a method in accordance with the present invention. The method 30 comprises the determination by a fuel gauge coupled to the BBB of the capacity of the BBB. The next step 34 requires compilation of the BBB capacity data for all of the BBBs in the ESS. A comparison of the relative BBB strengths allows the identification of the weakest BBB 36 and the calculation of the current required to charge the weakest BBB. The additional current requirements of the stronger BBBs are then calculated relative to the weakest BBB 38 . This information is provided to the integral charger which charges the BBB with the additional charge to respective BBBs. Each BBB in the ESS is then charged to the level of the weakest BBB and each of the stronger BBBs is charged to a maximum level from a dedicated integral charger.

Figure 5:
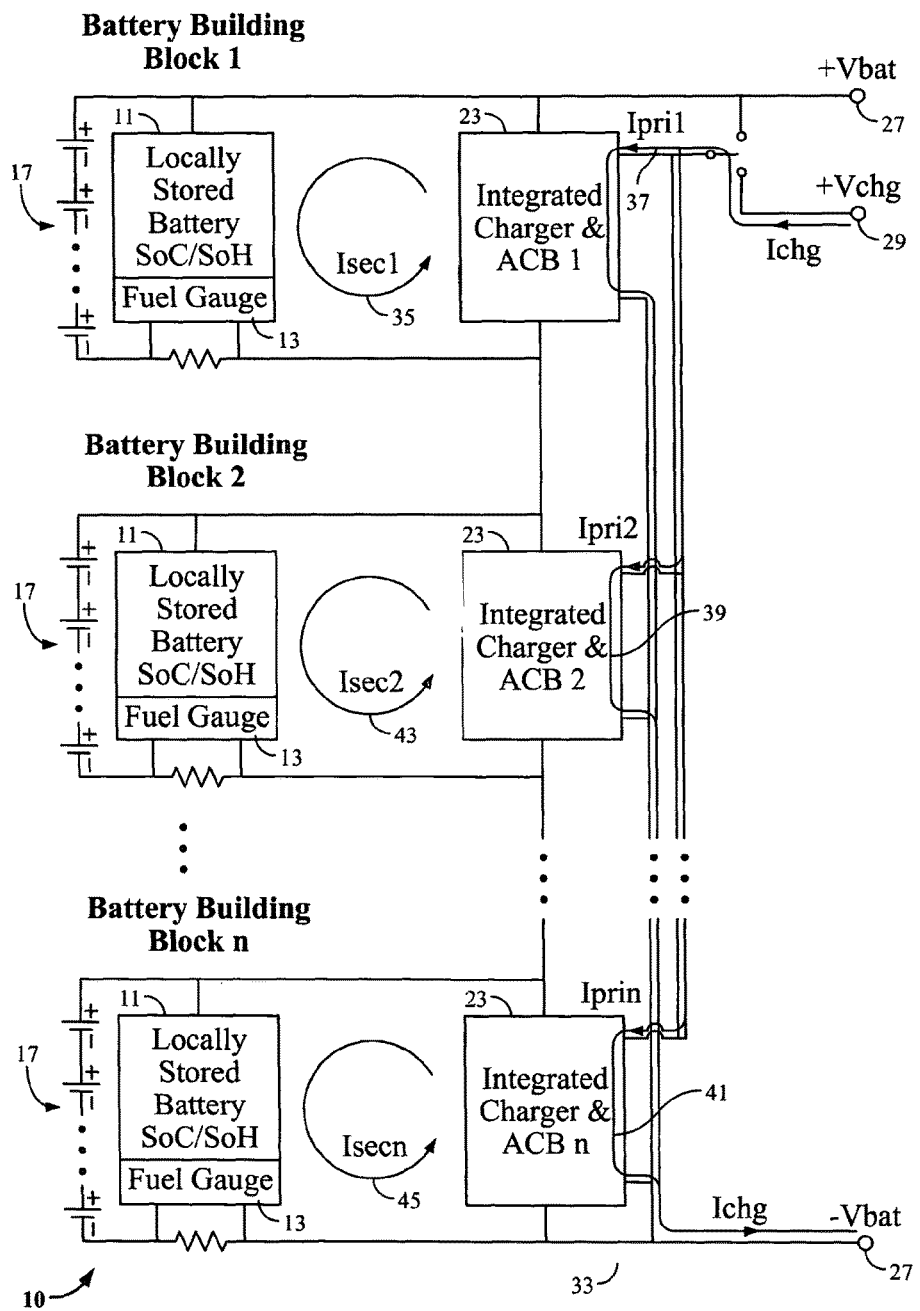
FIG. 5 is a schematic diagram which shows individual charging of BBBs in accordance with the example of FIG. 1.
Figure 6:
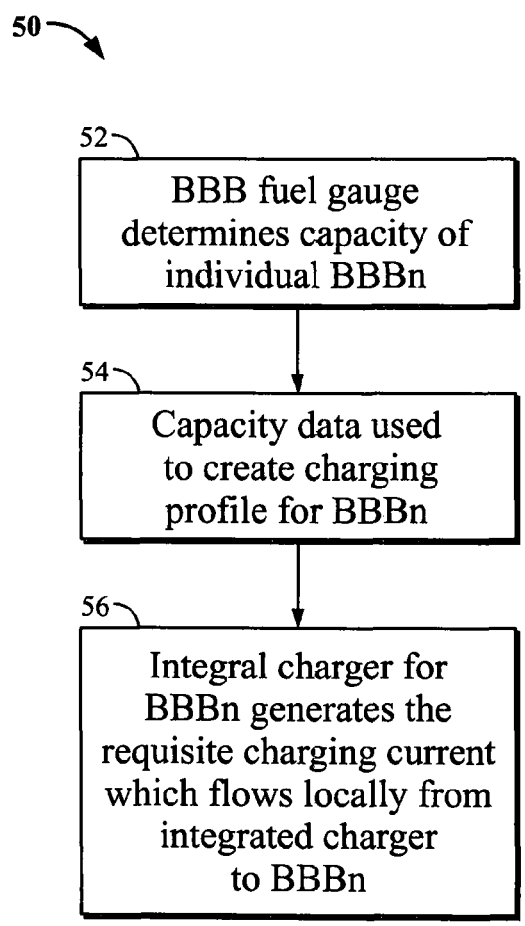
FIG. 6 is a flow diagram which illustrates the steps in an example of individual charging as shown in FIG. 5 and in accordance with the present invention.

FIGS. 5 and 6 show another example of a method of charging an ESS in accordance with the present invention which is of particular utility when the number of Integral chargers 23 is equal to the number of BBBs.

Each Integrated Charger 23 is supplied from a dedicated charge terminal +Vchg 29 and the power is provided from an external power supply, which could have a wider output voltage range and does not have to provide the charging profile for the battery chemistry used. In this example of the present invention, each integrated charger 23 provides the charging profile for the corresponding BBB, based on the information provided from the local fuel gauge 13.

All BBB charging currents flow locally between the Integrated charger 23 and the corresponding BBBs 5, 7 and 9 and they could differ from each other, based on the condition of each building block. In the example (FIG. 5) BBB 5 is charged with current Isec1 35, BBB 7 with Isec2 and so on.

Advantageously, this method allows for faster charging for the ESS than is possible in the other examples described herein, when the number of Integrated chargers is equal to the number of battery building blocks. In addition, it does not require the use of a dedicated external charger; a simpler less expensive power supply instead.

The method 50 of FIG. 6 shows the BBB fuel gauge determining the capacity of a BBB 52, the capacity data is used to create a charging profile 54 and the integral charger of a BBB generates the requisite charging current 56 which flows locally from the integral charger to the BBB.

Figure 7:
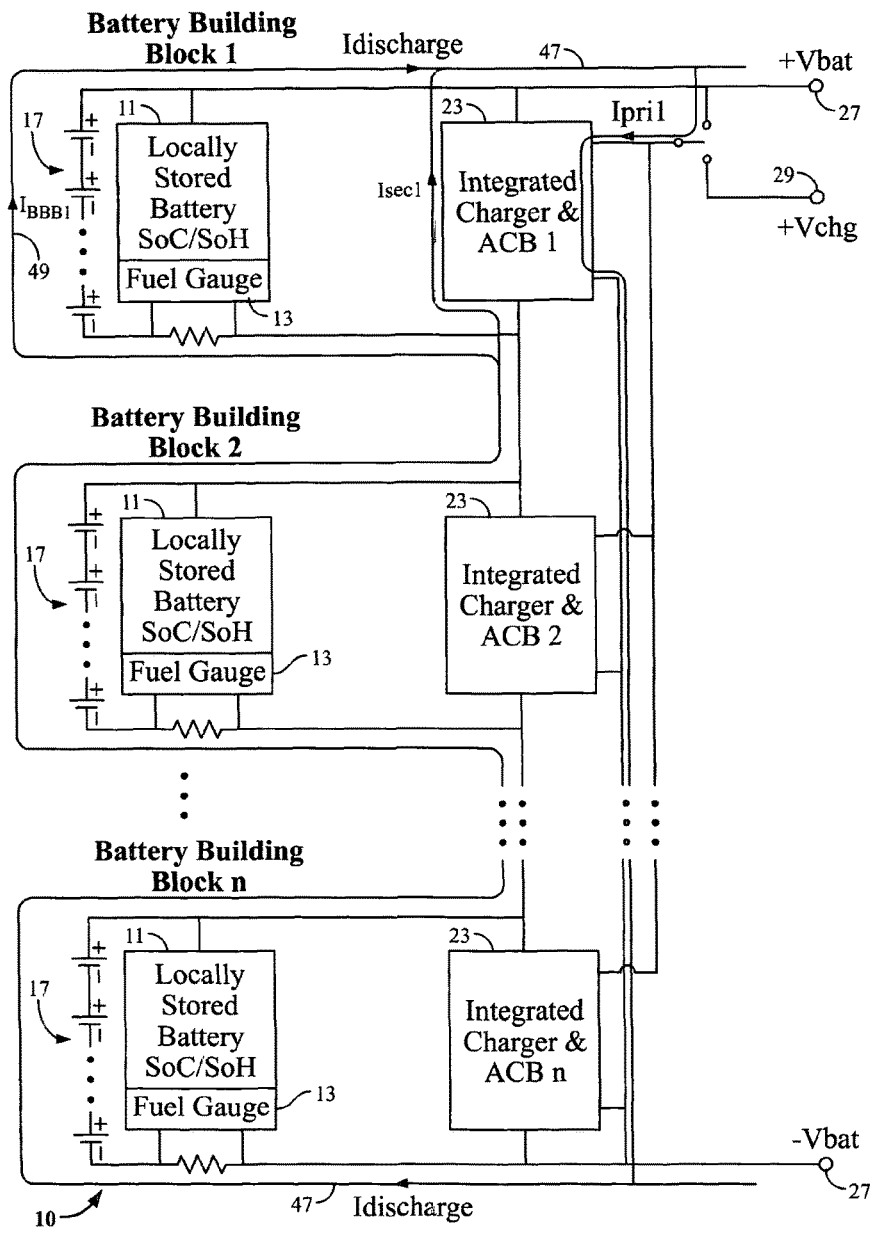
FIG. 7 is a schematic diagram which shows discharging of BBBs in accordance with the example of FIG. 1.

An example of discharging an ESS in accordance with the present invention is shown in FIG. 7. Discharging is the process of releasing the stored energy from each individual BBB into an external load. Ideally, the charged capacity and the SoC of each BBB will be equal and the discharge current to the load is the current flowing via each BBB 5, 7 and 9. However, BBBs may have different capacities and States of Charge due to factors such as ageing, defects, manufacturing tolerances of the cells, temperature deviations. In order to address this issue, the present invention provides a mechanism for equalization. The ESS uses an Active Balancing method, where the Integrated charger 23, delivers more current to the building blocks that have lower capacity or are unable to provide enough load current due to internal fault. In the example of FIG. 7, BBB 5 is being supported by its corresponding Integrated charger or by a common charging circuit, whose power is distributed to its terminals via a matrix of power switches. The resulting current delivered by BBB 5 is equal to the difference (discharge 47−Isec1 35, while all other BBBs supply the whole discharge current− Idischarge 47. If, for example, the BBB has an internal fault or is at the end of is's life life, the supporting current Isec1 35 could account for the whole discharge current, practically bypassing the BBB1.

Figure 8:
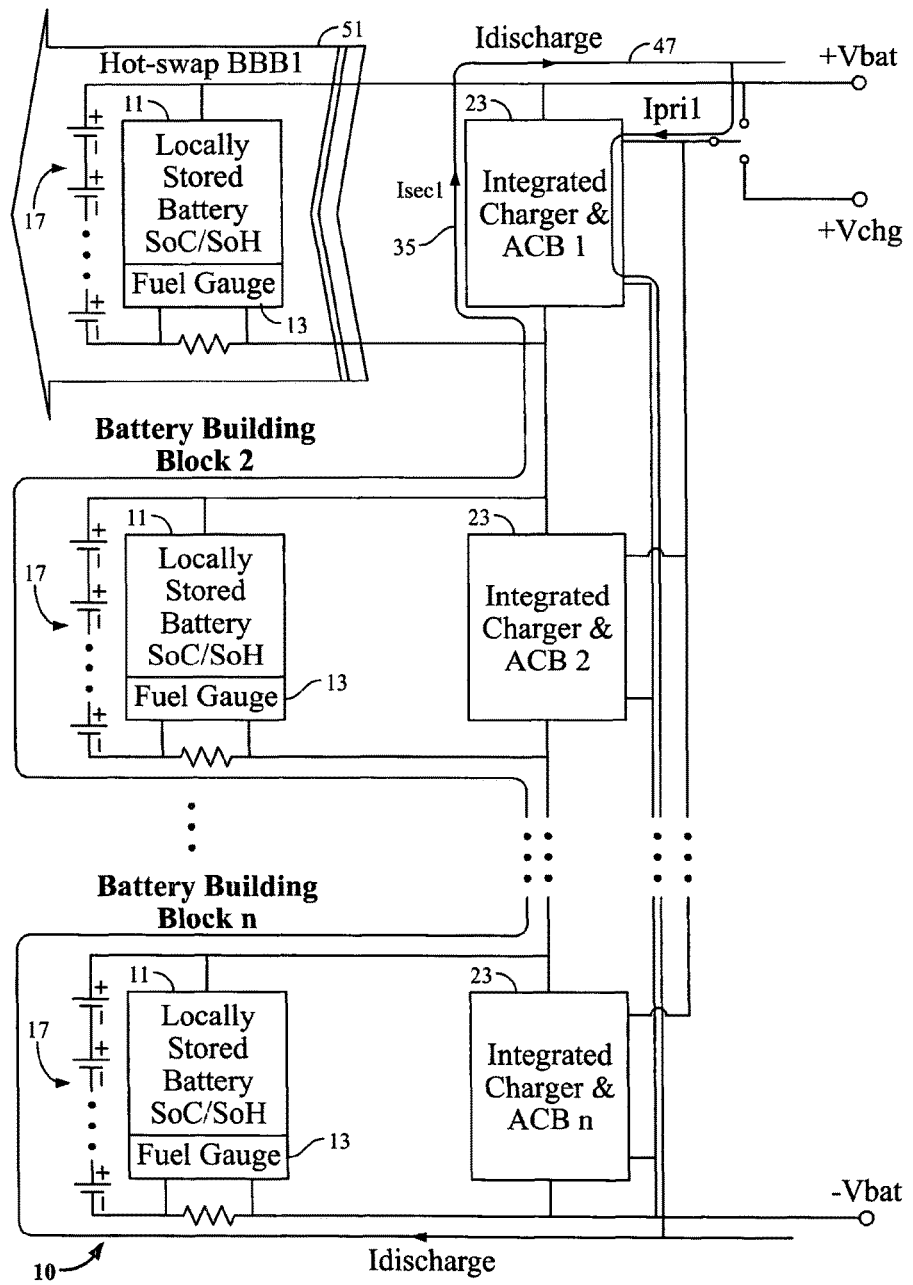
FIG. 8 is a schematic diagram which shows hot swapping of BBBs in accordance with the example of FIG. 1.

FIG. 8 shows an example of hot swapping which is the process of replacing during normal operation, a battery building block that has developed an internal fault or has reached its end of life.

BBBs that have lower capacity or are unable to deliver the whole discharge current due to an internal fault, are supported by the corresponding Integrated charger. In the case of a BBB that has developed an internal fault or the fuel gauge is reporting that its SoH is very poor, due to aging or misuse, the building block needs to be replaced. The present invention provides the means of doing this under operational conditions, without the need to switch off the load. The Integrated charger 23, supporting the BBB which is being replaced is configured to deliver the whole amount of load current, practically bypassing the building block which is being replaced. This allows the BBB to be ejected in the case of a rack-mounted enclosure or its hot-swap connection disengaged in the other cases and a fresh battery building block fitted instead.

In the example, FIG. 8, BBB 5 is being hot-swapped. For this to happen, the Integrated charger 23 delivers output current Isec1 35 equal to the discharge current Idischarge 47 thereby allowing power flow to the load without interruption during the process of extracting BBB 5 and replacing it with a new building block.

The process of swapping one building block with another is further enhanced by the fact that each BBB stores its lifetime data and its current parameters internally in a so called Battery Passport, which makes it easier for the ESS to accepts new components without a time for adaptation.

The BBB SoC, SoH and capacity information as well as its statistical parameters (serial number, time in service and lifetime exploitation data) are stored locally, so the moment the BBB is plugged in, the system controller knows its critical parameters and how to deal with it.

Advantageously, the present invention provides an ESS where there is no need for redundancy because the system controller provides a way of ensuring that the correct level of current is always supplied to the load when a BBB is being replaced. The present invention self-supports its weaker elements by an ACB using single Integrated charger and a matrix of power switches or a number of chargers equal to the number of building blocks.

The present invention solves the following shortfalls of the common approach known in the art.
1. The traditional systems used in critical applications have a multiple of units in order to achieve redundancy, while the proposed solution relies on self-supporting of the parts that are becoming compromised. The present invention avoids the higher cost, associated with use of a redundant battery
2. Stores up to date information of the SoC and SoH of each individual building block of the battery system locally, allowing for a seamless operation after replacing one building block with another
3. Uses the battery charging unit to redistribute power to the weaker building blocks saves space and reduces cost Improvements and modifications may be incorporated herein without deviating from the scope of the invention.

The invention claimed is:

1. An energy storage system comprising:
a plurality of battery building blocks which contribute load current to the output of the energy storage system, the battery building blocks comprising one or more electrical cell and a cell controller;
a system controller for providing functional control of the energy storage system and communication to an external host;
one or more system charger for charging the cells in the battery building blocks, wherein each battery building block is associated with an integrated charger;
an interface which provides a separate connection for at least two battery building blocks to allow the at least two battery building blocks to be separately removed from the energy storage system wherein, the system controller;
monitors the condition of the battery building blocks and determines a requirement to replace one of said battery building blocks; and
diverts the flow of current from the integrated charger associated with the battery building block to be replaced, wherein the charger provides a contribution to the load current in place of the contribution to the load current from the battery building block being replaced to allow said battery building block to be replaced whilst the energy storage system is in operation.

2. A system as claimed in claim 1 wherein, the system controller detects battery building block malfunction based upon data received from the cell controller.

3. A system as claimed in claim 1 wherein, the integrated charger from which current is diverted is the integrated charger which, in normal use, provides current to the battery building block which is to be replaced.

4. A system as claimed in claim 1 wherein, the contribution to the load current from the integrated charger matches the normal operational current from the battery building block which is being replaced.

5. A system as claimed in claim 1 wherein, the cell controller monitors the cells in a battery building block and collects data related to the state of charge and state of health of the cells in the battery building block.

6. A system as claimed in claim 1 wherein, the battery building block further comprises protection circuitry.

7. A system as claimed in claim 6 wherein, the protection circuitry provides overcurrent and/or short-circuit, overvoltage and/or under voltage and/or over temperature protection.

8. A system as claimed in claim 1 wherein, the cell controller comprises a Fuel Gauge.

9. A system as claimed in claim 8 wherein, the Fuel Gauge comprises a coulomb counter.

10. A system as claimed in claim 8 wherein, the Fuel Gauge comprises an impedance tracker.

11. A system as claimed in claim 8 wherein, the cell controller calculates the State of Charge (SoC) of the BBB.

12. A system as claimed in claim 1 wherein, the cell controller calculates the battery building blocks current capacity.

13. A system as claimed in claim 1 wherein, the cell controller comprises a microprocessor controller which calculates the State of Health (SoH) of the battery building block from the data provided by the Fuel Gauge.

14. A system as claimed in claim 13 wherein, the State of Health (SoH) data is stored in a local memory device located within the battery building block.

15. A system as claimed in claim 14 wherein, the local memory device stores up to date information on battery building block operating parameters.

16. A system as claimed in claim 1 wherein, the system controller comprises n Chargers which provide dedicated charging or supporting the discharge current in n separate battery building blocks.

17. A system as claimed in claims 1 wherein, the system comprises n Chargers which provide charging or supporting the discharge current in m separate battery building blocks where m>n.

18. A system as claimed in claim 1 wherein, the system controller further comprises a matrix of power switches, which connects the power output of respective chargers to the battery building blocks.

19. A system as claimed in claim 1 wherein, the system controller is contained in a housing.

20. A system as claimed in claim 19 wherein the battery building blocks are placed in a plug-in tray and those trays are plugged into the housing which provides power connection and control signal communication between each battery building block and the system controller.

21. A system as claimed in claim 1 wherein, the system controller is removeably coupled to each battery building block to allow easy plug in and out of an individual battery building block.

* * * * *